(12) United States Patent
Skelley

(10) Patent No.: US 11,130,690 B2
(45) Date of Patent: Sep. 28, 2021

(54) COMPOUND SOLUTION AND METHOD FOR LIVESTOCK

(71) Applicant: Biocide Solutions, LLC, Nashville, TN (US)

(72) Inventor: Joe Nichols Skelley, Memphis, TN (US)

(73) Assignee: Biocide Solutions, LLC, Nashville, TN (US)

( * ) Notice: Subject to any disclaimer, the term of this patent is extended or adjusted under 35 U.S.C. 154(b) by 56 days.

(21) Appl. No.: 16/602,854

(22) Filed: Dec. 12, 2019

(65) Prior Publication Data

US 2021/0179459 A1 Jun. 17, 2021

(51) Int. Cl.
| | |
|---|---|
| C02F 1/68 | (2006.01) |
| C02F 9/00 | (2006.01) |
| B08B 3/08 | (2006.01) |
| C11D 7/26 | (2006.01) |
| C02F 1/72 | (2006.01) |
| C11D 7/08 | (2006.01) |
| A01K 7/00 | (2006.01) |

(52) U.S. Cl.
CPC .............. *C02F 1/68* (2013.01); *A01K 7/00* (2013.01); *B08B 3/08* (2013.01); *C02F 1/686* (2013.01); *C02F 1/722* (2013.01); *C02F 9/00* (2013.01); *C11D 7/08* (2013.01); *C11D 7/265* (2013.01); *C02F 2303/04* (2013.01); *C02F 2305/023* (2013.01)

(58) Field of Classification Search
CPC ........ C02F 1/68; C02F 9/00; C02F 2305/023; C02F 1/66; C02F 1/686; C02F 1/72; C02F 1/722; C02F 2103/02; C02F 2103/10; C02F 2209/06; C02F 2303/04; C02F 2305/00; A01K 5/00; A01K 7/00; A01K 7/02; A01K 7/06; A01N 25/02; A01N 37/02; A01N 37/06; A01N 41/00; A61K 8/22; A61K 31/16; A61K 31/185; A61K 31/19; C01B 5/00; C01B 15/01; C01B 15/013; C01B 15/027; C01B 17/69; C01B 17/74; C01B 17/88; C01B 17/90; C07C 59/265; C11D 7/06; C11D 7/08; C11D 7/265; B08B 3/00; B08B 3/04; B08B 3/08
USPC ......... 210/754, 755, 759, 764; 119/51.5, 72; 426/70, 74; 424/405, 616, 659, 666, 703; 423/437.1, 522, 584
See application file for complete search history.

(56) References Cited

U.S. PATENT DOCUMENTS

| | | | | |
|---|---|---|---|---|
| 4,051,057 A | * | 9/1977 | Ericson | .................. C23G 1/103 |
| | | | | 510/254 |
| 4,310,522 A | * | 1/1982 | Frank | ..................... A61K 31/59 |
| | | | | 514/167 |
| 6,901,881 B2 | * | 6/2005 | Pollock | ............. A01K 39/0213 |
| | | | | 119/72.5 |

(Continued)

*Primary Examiner* — Joseph W Drodge
(74) *Attorney, Agent, or Firm* — Desireé J. C. Goff

(57) ABSTRACT

The primary objective of the present invention is to provide a composition solution for livestock water and feed which eliminates harmful bacteria and encourages consumption. In certain embodiments, this composition solution may also remove bacteria from produce, treat water flows, process oilfield wastewater, destroy taste and odor contaminants in potable and drinking water, remove destructive contaminants from a wide range of industries, and eliminate hazardous pollutants.

5 Claims, 1 Drawing Sheet

$$H_2SO_4 + C_6H_8O_7$$
$$+$$
$$H_2O_2$$
$$+$$
$$H_2O$$
$$= COMPOUND\ SOLUTION$$

(56) References Cited

U.S. PATENT DOCUMENTS

| | | | |
|---|---|---|---|
| 7,255,889 B2 * | 8/2007 | Sachindra | A23L 13/50 |
| | | | 426/589 |
| 7,510,721 B2 * | 3/2009 | Roden | A61P 31/04 |
| | | | 424/400 |
| 9,549,565 B2 * | 1/2017 | Wilborn | A23K 20/20 |
| 9,999,239 B2 * | 6/2018 | Blotsky | A23K 20/22 |
| 2004/0211935 A1 * | 10/2004 | Roden | A23L 3/358 |
| | | | 252/62 |
| 2010/0143491 A1 * | 6/2010 | Kawabata | A01N 59/00 |
| | | | 424/605 |
| 2012/0052133 A1 * | 3/2012 | Allen | A23B 4/24 |
| | | | 424/616 |
| 2013/0251590 A1 * | 9/2013 | Golden | A01N 59/00 |
| | | | 422/24 |
| 2014/0328941 A1 * | 11/2014 | Bui | A01N 59/00 |
| | | | 424/616 |
| 2016/0298209 A1 * | 10/2016 | Mujicic | C22B 15/0076 |
| 2017/0173196 A1 * | 6/2017 | Sherry | A01N 59/00 |
| 2020/0281197 A1 * | 9/2020 | Briggs | A01N 33/12 |

* cited by examiner

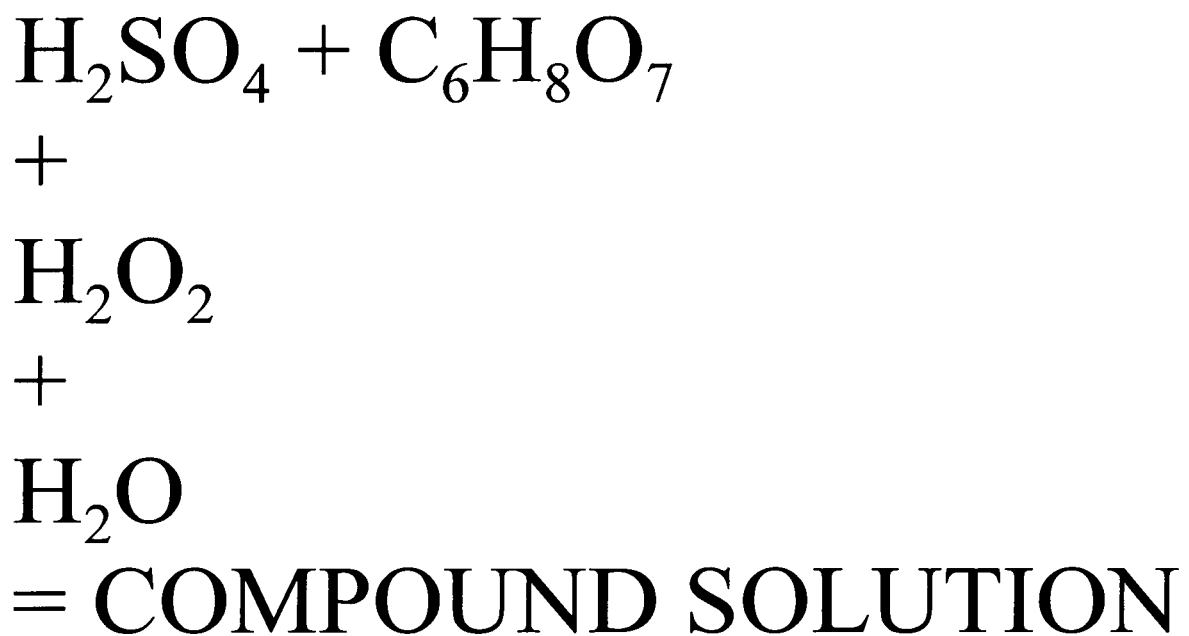

COMPOUND SOLUTION AND METHOD FOR LIVESTOCK

FIELD

The present invention is directed to compositions and methods for improved animal supplements and animal water.

BACKGROUND OF THE INVENTION

The livestock industry, and the poultry industry, have made significant steps in revitalizing animal care.

For mass consumption, animals are generally raised in large scale production facilities, in contrast to farming practices in past times where animals were raised in smaller farming operations. Large scale production facilities with their attendant crowding of animals, increased infection control, and stressful lifestyle for the animals, require more human control of the animals' environment and diet.

One particularly large scale production of animal husbandry is poultry. Poultry production comprises meat production and egg production. Meat poultry is selected for good meat type, fast growth, disease resistance, and efficient conversion of feed to meat.

Previous patents have directed attention to food or water supplements or additives that can increase the meat production or egg laying capacity, enhance the overall health of the animals and lower the costs of raising poultry. These fall short however because they fail to address the need for poultry to drink or eat more, and they fail to take into account the bacteria present in livestock feed and nutrition, including water solutions.

None of these previous supplements address the persistent problem for anti-bacterial solutions and compositions which will kill off bacteria harmful to the livestock while inducing them to drink and eat more. Current solutions which include chlorine bleach fail to address this problem because the livestock do not like the taste of it and balk at drinking or eating solutions containing it.

Additional uses of this compound solution may replace fruit and vegetable produce solutions to kill off harmful bacteria while avoiding the harmful effects of current applications of chlorine gas on workers without damaging produce.

REFERENCES

| | | |
|---|---|---|
| U.S. Pat. No. 6,901,881 B2 | Pollock | 2005 |
| U.S. Pat. No. 9,999,239 B2 | Blotsky | 2018 |
| U.S. Pat. No. 9,549,565 B2 | Wilborn | 2017 |
| 4,310,522 | Frank | 1982 |
| 7,510,721 B2 | Roden | 2009 |
| 7,255,889 B2 | Sachrinda | 2007 |

BRIEF SUMMARY OF THE INVENTION

The primary objective of the invention is to provide a livestock concentration which kills bacteria while enhancing nutrition. This composition includes at least one strong acid with at least one weak acid and a hydrogen peroxide solution. It further relates to a process for the preparation of the livestock concentration, and for application in additional industries, including cleansing fruit and vegetable produce, and water equipment cleanliness through removal of biofilms and mineral buildup.

The presently disclosed invention relates to a composition including one or more strong acids with one or more weak acids and a hydrogen peroxide solution. Non-limiting examples of strong acids include hydrochloric acid, hydrofluoric acid, hydrobromic acid, sulfuric acid, phosphoric acid, nitric acid, chloric acid, perchloric and hydroiodic acid. Non-limiting examples of weak acids include citric acid, boric acid, carbonic acid, propionic acid, lactic acid and acetic acid.

The present invention provides general biocide activity from the synergy of a strong mineral acid in combination with a weak organic acid and peroxide solution.

The present invention is useful in chicken water and all livestock water, or as an additive to feed. This solution will reduce bacteria present in the water or feed and induce the livestock to eat more, thereby promoting higher quality and better poultry, meat and egg production.

The present invention is useful in the cleansing and washing of produce, including vegetables and fruit, replacing harmful gases and reducing bacteria present from the agriculture industry.

The present invention has additional uses in industrial, medical, military, and household applications. This composition relates to a method of treating water, which includes adding the stabilized compound to water flows. In certain embodiments, the water flows can be reused. In some embodiments, the water flow is used in an industrial process to cost-effectively produce a targeted reaction. In certain embodiments, this invention relates to the industrial process comprising breaking down toxic and corrosive sulfides in processing waters of the oilfield and wastewater, destroying taste and odor contaminants in potable and drinking water, and processing contaminants in cooling water, removal of destructive contaminants from processing waters in the electronics and pharmaceutical industries, destruction of fouling biofilm in processing and cooling waters, or elimination of hazardous pollutants in wastewater. The present invention comprises methods and compositions for reducing corrosion on steel. The present invention comprises methods and compositions for reducing or preventing infection.

BRIEF DESCRIPTION OF THE DRAWINGS

FIG. 1 illustrates a flow diagram of a preferred embodiment of the present invention.

DETAILED DESCRIPTION AND BEST MODE OF IMPLEMENTATION

The present invention comprises compositions and methods for livestock solution. The present invention comprises composition for anti-bacterial enhancement of livestock water, directed but not limited to, poultry, pork and beef and comprises use of water supplements formulated for feeding to animals at all stages of growth. While suitable for the above-mentioned animals, it can also enhance the health of other animals. The invention is mainly described with reference to its application in raising poultry. The term poultry is generally used for all sorts of breeds of domesticated birds, independent of their age, comprising chickens, ducks, geese, emu, pigeons, turkeys and ostriches.

Compositions and methods of the present invention comprise providing feed or water solutions comprising an anti-bacterial element composition to livestock.

In a preferred embodiment of the invention, 13 ounces of strong acid, preferably sulfuric acid, is mixed with 26 ounces of weak acid, preferably citric acid. This solution is stored in a separate container and combined with 89 ounces of hydrogen peroxide solution on location. This composition solution is then diluted with water in the amount of 5 ounces per gallon of water at time of use.

In another embodiment of this invention, this composition solution is diluted 1 ounce per gallon of water at time of use. This solution may be delivered under medicator pump and delivered in water lines to poultry houses.

In another embodiment of this invention, this composition solution is diluted ½ ounce per gallon of water at time of use.

In all preferred embodiments of this invention, the strong acid mixed with weak acid is stored in a separate container from the peroxide. On location, the acid solution is mixed with the peroxide and this composition solution is then diluted with water to the preferred embodiment ratio. This is necessary to prevent loss of potency and breakdown of solution.

I claim:

1. A method for preparation of livestock water, said method comprising the steps of:
   (a) Combining 13 ounces a quantity of a strong acid with 26 ounces a quantity of a weak acid to form a solution;
   (b) Transporting the solution to a livestock location;
   (c) Mixing the solution with 89 ounces a quantity of a hydrogen peroxide to form a composition solution; and
   (d) Diluting the composition solution with a quantity of water to form livestock water, in a medicator or other delivery device, for livestock consumption.

2. The method according to claim 1 in which 5 ounces of the composition solution is mixed with a quantity of water in the amount of 1 gallon of water to form livestock water.

3. The method according to claim 1 in which 1 ounce of the composition solution is mixed with a quantity of water in the amount of 1 gallon of water to form livestock water.

4. The method according to claim 1 in which ½ ounce of the composition solution is mixed with a quantity of water in the amount of 1 gallon of water to form livestock water.

5. A method for preparation of a composition solution, said method comprising the steps of:
   (a) Combining a quantity of strong acid with a quantity of weak acid to form a solution;
   (b) Transporting the solution to a location;
   (c) Mixing the solution with a quantity of hydrogen peroxide to form a composition solution;
   (d) Diluting the composition solution with a quantity of water; and
   (e) Applying the diluted composition solution to cleanse produce, wastewater, or industrial equipment.

* * * * *